United States Patent
Erickson

[15] 3,659,319
[45] May 2, 1972

[54] ADHESIVE WIRE ROUTING CLIP

[72] Inventor: Lloyd A. Erickson, 8501 West Higgins Road, Chicago, Ill. 60631

[22] Filed: Nov. 30, 1970

[21] Appl. No.: 93,599

[52] U.S. Cl.............................................24/73 AP, 248/74 A
[51] Int. Cl. ........................................A44b 21/00, F16l 3/08
[58] Field of Search........24/DIG. 11, 73 A, 73 SP, 230.5 TP, 24/161 A, 156; 248/65, 71, 204, 205 A, 74 A

[56] References Cited

UNITED STATES PATENTS

| | | | |
|---|---|---|---|
| 3,516,631 | 6/1970 | Santucci | 248/205 A X |
| 2,692,415 | 10/1954 | Forde | 24/156 R |
| 2,913,204 | 11/1959 | Stewart | 248/71 |
| 3,542,321 | 11/1970 | Kahabka | 24/DIG. 11 UX |

FOREIGN PATENTS OR APPLICATIONS 894,867  4/1962  Great Britain.......................248/74 A Primary Examiner—Donald A. Griffin
Attorney—Robert W. Beart, Michael Kovac and Jack R. Halvorsen

[57] ABSTRACT

A routing clip for mounting conduits, electrical conductors, tubing and similar workpiece elements, and having a base with outwardly extending posts terminating in inwardly directed hook-like extensions with the free ends thereof relatively underlying one another with respect to the base and in spaced relationship to form a relatively narrow entrance throat to trap included workpiece element; the base being somewhat flexible for attachment thereof, as by adhesive means, to other than perfectly flat surfaces, such as surfaces curved on a relatively large radius, and without substantially changing the size of the entrance throat.

5 Claims, 4 Drawing Figures

PATENTED MAY 2 1972　　　　　　　　　　　　　　3,659,319

INVENTOR.
Lloyd A. Erickson
BY
His Att'ys

ADHESIVE WIRE ROUTING CLIP

This invention is concerned with a resilient one-piece molded plastic clip for mounting on a support surface in the routing of wires, conduits, tubing and other workpiece elements therealong.

Various forms of resilient clips have been provided for routing such workpiece elements. In many instances, an arm is flexed outwardly relative to a base when the element or elements are inserted in the clip. In other instances, pairs of arms may be separated by flexing for insertion of the elements therebetween. These clips may be attached to a support surface by various means, such as by a pressure sensitive adhesive layer carried by the base of the clip. In many instances, there is a tendency for the entrance throat to become enlarged if the workpiece elements are crowded too tightly with the clip and in the case of quite small individual elements, there is increased likelihood of one or more such elements to escape through the throat opening. Also, in most instances, the bases of the clips have been substantially rigid and shaped for matching with a particular support surface of the installation.

According to the present invention, the base of the clip is somewhat flexible to facilitate mounting to a flat or slightly curved surface. Posts project outwardly from the base in spaced relation and terminate in inwardly extending arms with the free extremities in spaced relatively underlying relationship with respect to the base and forming therebetween a narrow entrance throat for the insertion of the workpiece elements therethrough.

An object of the present invention is to provide a routing clip of the above type wherein the mounting thereof on a slightly concave support surface does not materially alter the size of the throat opening, thus assuring retention of included workpiece elements.

Another object of the invention is to provide a routing clip of the above type wherein one of the terminal arms is elongate with respect to the other arm and underlies the latter for flexing as workpiece elements are inserted through the throat opening.

A further object of the invention is to provide a clip substantially of the above type wherein the base has a transverse center section of reduced thickness relative to the end portions for facilitating mounting the clip to a slightly curved surface without unduly stressing the mounting connecting means therebetween.

The above and other objects of the invention will in part be obvious and will be hereinafter more fully pointed out in connection with the description of the drawing in which the figures are as follows.

Figure 1:
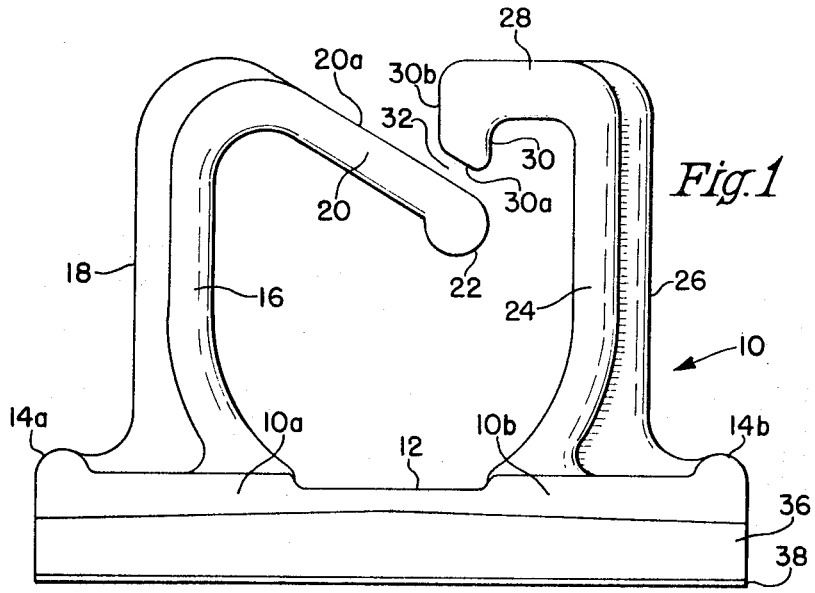
FIG. 1 is a side elevation of the routing clip in normal position.
Figure 3:
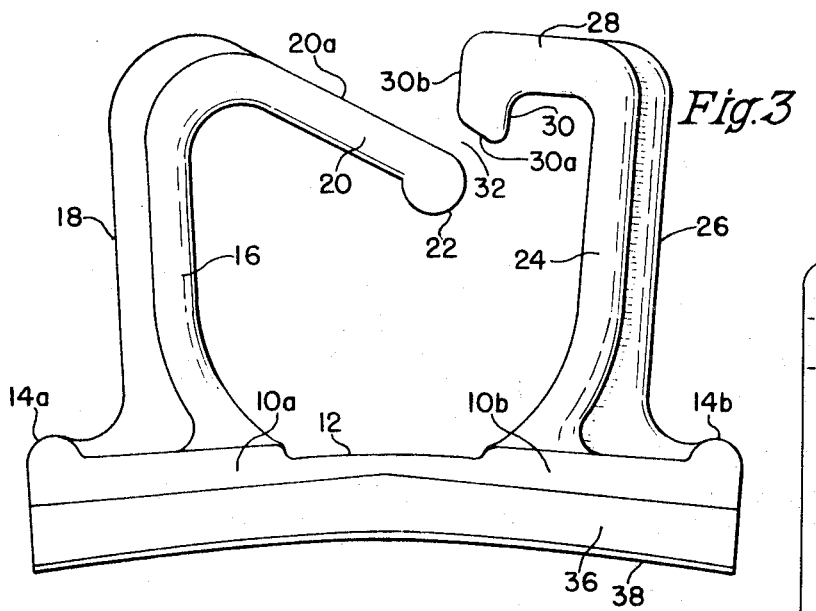
FIG. 3 is an elevation similar to FIG. 1 but showing relative positions of the posts and arms as the base is flexed for curved surface mounting.
Figure 2:
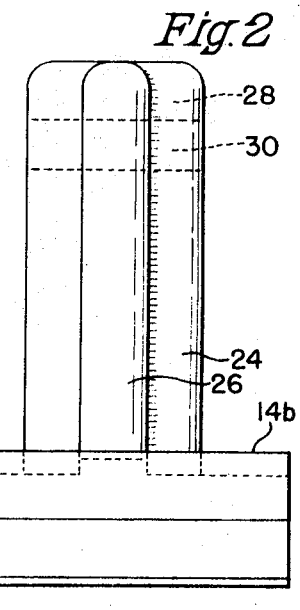
FIG. 2 is an end elevation of FIG. 1.

With reference to FIGS. 1, 2 and 3 of the accompanying drawing, the clip includes a base member 10 having transverse end portions 10a, 10b which are relatively thicker than a central section 12 which, in turn, provides a flexing area to conform the base member to the supporting surface. There are transverse strengthening ribs 14a, 14b across the ends of the base member. A post 16 extends vertically from the base section 10a and is reinforced by a central vertical rib 18. The post 16 terminates in an arm 20 extending inwardly and downwardly inclined toward the base with a transverse end reinforcing rib 22 and presenting an upper inclined surface 20a. A similar post 24 extends vertically outwardly from the base section 10b and is substantially parallel to the post 16. This post is reinforced by a central rib 26 and terminates in an inwardly extending arm 28 which, in turn, terminates in a depending lip 30 having a downwardly facing inclined surface 30a generally parallel to the inclined surface 20a on the arm 20.

As shown in FIG. 1, the inclined arm 20 extends beyond the vertical center line of the base member 10 and the arm 28 terminates short thereof such that the ribbed extremity 22 of the arm 20 underlies the inclined surface 30a on the lip 30 to provide a narrow throat opening 32 to which the inclined surface 20a of the arm 20 leads, as does the vertical edge 30b of the lip 30. These surfaces 20a and 30b provide a funneling channel to assist in guiding workpiece elements toward the entrance throat 32. Usually the workpiece elements, such as electrical conductors and the like, are slightly larger in cross section than the width of the throat opening and are forced therethrough to be trapped within the confines of the arms, posts and base member. Such forcible entry of the workpiece elements will enlarge the throat opening by causing a downward flexing of the longer arm 20 which, however, will return to original position due to the inherent resiliency thereof. The clip is formed of molded plastic material selected to afford the desired resiliency not only of the arm 20 but also of the center section 12 of the base. In some instances, smaller workpiece elements may pass freely through the throat opening but the underlying relationship between the extremities of the arms forming the narrow throat opening at a downward angle into the clip confining area reduces the chance for egress of the workpiece elements after initial assembly. In some instances where larger workpiece elements are to be pre-assembled with the clip before mounting thereof, the hinge section 12 of the base will permit separation of the posts 16, 18 quite beyond the position of FIG. 3 for this purpose. Thereafter, the posts will return to normal position trapping the workpiece elements and the clip may be slipped therealong to proper location for mounting the same on a support surface.

Figure 4:
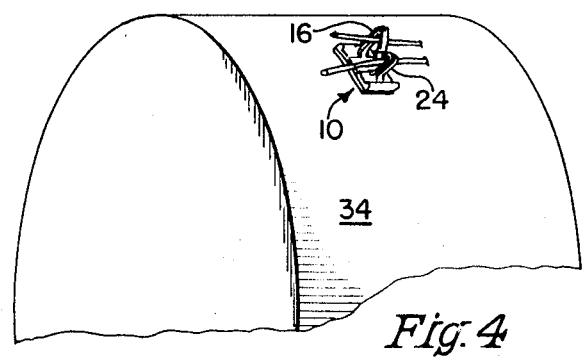
FIG. 4 is a fragmentary perspective view of the routing clip mounted on a drum-like support surface.

While the clip may be mounted on a flat surface, it has been previously indicated that it is adapted for mounting on a gradually curved surface, such as the surface of the dryer drum 34 of a clothes dryer as shown in FIG. 4. For this purpose, the bottom surface of the base may be slightly relieved toward the center and the base may be flexed to a position such as that shown in FIG. 3 to approximate the contour of the support surface. In assuming this position, the posts will separate slightly and cause slight lateral movement between the arms 20, 28. In doing so, the entrance length of the throat opening 32 will be shortened but the width thereof will not be materially enlarged, thus to assure trapping of the included workpiece elements against inadvertent escape through the throat opening. The lateral extent of relative underlying relationship between the free extremities of the arms may be varied by changing the lengths of these arms and the area of underlying relationship may more closely approach the vertical center line of the base, if desired, although it is probably desirable to have the longer arm in most instances for flexibility thereof.

Mounting of the clip on a support surface may be accomplished in various ways on a flat surface but when mounting the same on a slightly curved surface, it has been found advantageous to adhesively secure a resilient or sponge-like layer 36 to the bottom surface of the base 10, with this layer 36 having a pressure sensitive adhesive layer 38 which may be protected prior to use by a removable covering (not shown). Thus, in applying the clip to a slightly curved surface, or a flat surface, the clip is pressed against the support surface for attachment thereto by the adhesive layer 38. The intermediate layer 36 assists in the contoured adhesion between the support surface and the adhesive layer, and with the relatively weakened central section 12 of the base, reduces any tendency for the slightly curved base to part the adhesive connection with the support surface.

With the interposed sponge-like layer 36, it is possible for the post members 16, 24 to separate slightly when larger workpiece elements are forced through the throat opening 32, thus supplementing flexing of the arm 20. In doing so, the layer 36 will be slightly compressed beneath the relatively thick end portions 10a, 10b of the base member. The resultant slight upward flexing of the center section 12 will stretch the sponge-like layer 36 but not to the extent of breaking adherence between the underlying adhesive layer 38 and a support surface, such as the slightly curved surface of the drum 34.

I claim:

1. A routing clip for supporting workpiece elements, such as electrical conductors and the like and comprising a base member presenting one surface for mounting to a support surface, said base member having a central section of reduced thickness permitting limited flexing thereof for contouring to a slightly curved support surface, a pair of post members projecting outwardly from the opposite surface of the base member in spaced apart relationship, each post member terminating in an arm extending inwardly toward the opposite post member and with one of said arms having the free extremity thereof underlying the free extremity of the other arm in spaced relationship to provide a restricted entrance through the throat for admission of workpiece elements therethrough to trapped position within the clip, means for attaching the clip to support surface, flexing of said base member for curved surface mounting adapted to effect a length shortening of the throat opening without materially increasing the width whereby to maintain a trapping restriction against egress of included workpiece elements.

2. A clip as claimed in claim 1, wherein the underlying arm is elongate and inclined toward the base member to underlie a depending lip on the other arm defining therebetween the throat opening located proximate to the vertical center line of the base member.

3. A clip as claimed in claim 2, wherein the post members are substantially rigid with the base member and the underlying arm is slightly flexible to be urged away from the depending lip on the other arm upon forced passage of workpiece elements through the throat opening.

4. A clip as claimed in claim 1, wherein the means for securing the clip to a support surface comprises a layer of pressure sensitive adhesive across the surface of the base member adjacent the support surface.

5. A clip as claimed in claim 4, wherein the post members are substantially rigid with the base member which includes a central section of reduced thickness for flexing of the base member to conform to a support surface, and wherein there is provided, between the adhesive layer and the base, a sponge-like layer permitting compression thereof under the post ends of the base member as the post members are separated to enlarge the throat opening upon passage of workpiece elements therethrough for assembly with the clip.

* * * * *